United States Patent [19]

Hakoda et al.

[11] Patent Number: 5,006,059
[45] Date of Patent: Apr. 9, 1991

[54] MOLD FOR INJECTION MOLDING OF TOOTHED POWER TRANSMISSION BELT

[75] Inventors: Keizo Hakoda; Hisashi Samejima, both of Kobe, Japan

[73] Assignee: Bando Kagaku Kabushiki Kaisha, Kobe, Japan

[21] Appl. No.: 483,251

[22] Filed: Feb. 22, 1990

[51] Int. Cl.$^5$ .............................................. B29C 45/27
[52] U.S. Cl. .................................. 425/573; 249/107; 249/141; 249/142; 425/123; 425/129.1; 425/577; 425/812
[58] Field of Search ...................... 425/120, 123, 129.1, 425/544, 573, 577, 812; 249/107, 142, 144, 141

[56] References Cited

U.S. PATENT DOCUMENTS

| | | | |
|---|---|---|---|
| 1,928,325 | 9/1933 | Apple | 425/123 |
| 3,425,883 | 2/1969 | Smith | 425/123 |
| 3,441,641 | 4/1969 | Roberts | 425/573 |
| 4,174,367 | 11/1979 | Breher | 425/123 |

FOREIGN PATENT DOCUMENTS 47-11692 6/1972 Japan .

Primary Examiner—James C. Housel
Attorney, Agent, or Firm—Marshall, O'Toole, Gerstein, Murray & Becknell

[57] ABSTRACT

A mold for injection molding including a cylindrical outer mold and a columnar inner mold. The inner mold is provided, on its external circumferential surface, with a large number of tooth-shaped grooves extending in the axial direction thereof, and it is placed inside the outer mold to define an annular cavity between the external circumferential surface of the inner mold and the internal circumferential surface of the outer mold. The outer mold is provided with a plurality of runners extending axially near the internal circumferential surface. The runners are arranged at regular annular intervals along the circumference of the outer mold. Furthermore, slit-shaped gates are formed along the full length of the runners, the gates opening into the internal circumferential surface of the outer mold, in such a way that the inflow of molten molding material flowing from each runner into the cavity is gradually reduced along the runner from the upstream side towards the downstream end.

2 Claims, 3 Drawing Sheets

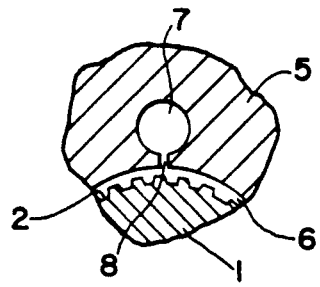
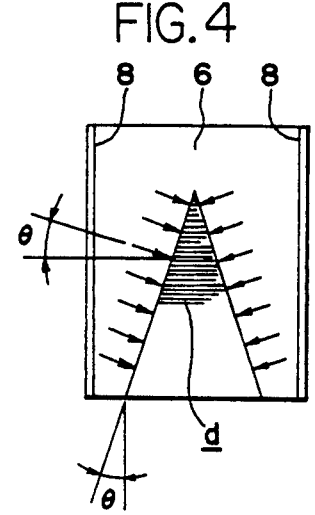
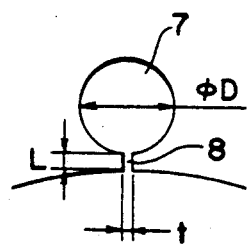
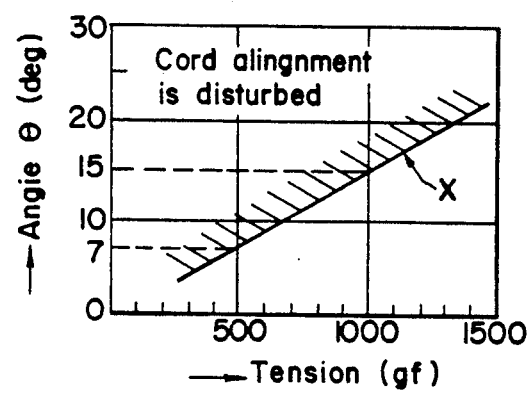
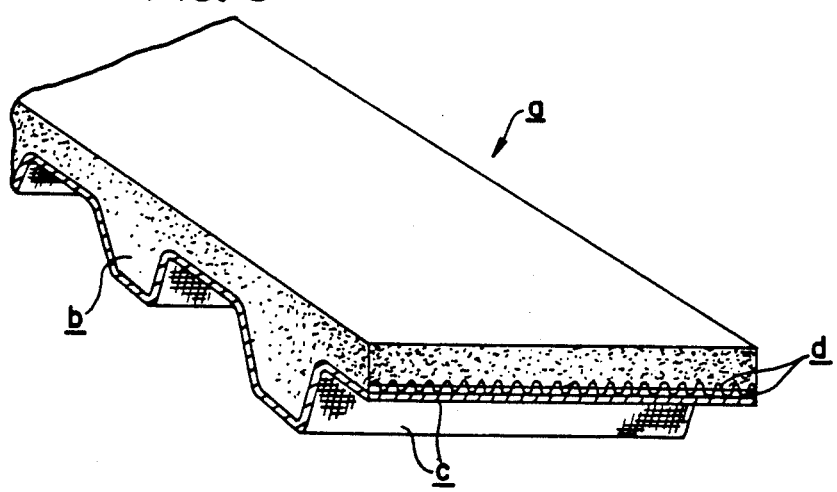

MOLD FOR INJECTION MOLDING OF TOOTHED POWER TRANSMISSION BELT

FIELD AND BACKGROUND OF THE INVENTION

This invention relates to a mold for injection molding of toothed power transmission belt having embedded cords as the tensile element.

Up to the present time, toothed power transmission rubber belts have usually been produced using a vulcanizer by the following method. First, canvas for protecting the teeth flanks, cords serving as tensile elements, and unvulcanized rubber sheets are wound in multiple layers around a mold having tooth-shaped grooves on the outer circumferential surface thereof. After that, the assembly is placed in a vulcanizer, and high pressure steam is introduced into the vulcanizer to pressurize and heat the assembly so as to effect cross-linking (vulcanization) of the rubber sheets. Then the tubular molded part together with the mold is removed from the vulcanizer, and the molded part is removed from the mold. The part is cut crosswise into shorter width rings having the desired width and finished to form power transmission belts, the final product.

This production method using a vulcanizer has a problem related to productivity. The production of belts by this method involves many steps since it is necessary, first, to produce rubber sheets with a desired thickness by means of a calender or the like, and then to wind the rubber sheets in layers around the canvas and cords that have been wound around the mold. Furthermore, the cross-linking cannot be completed in a short time. The cross-linking takes much time since the thermal conductivity of rubber itself is low whereas the cross-linking reaction is promoted by the heat transfer from the steam.

The above production method using a vulcanizer also has a problem regarding quality. In case of a rubber sheet material of which fluidity is low even when heated by steam, the material may not be sufficiently forced into the tooth grooves on the mold, resulting in a defective forming of the teeth of the belt. In such a case, it may improve the teeth forming to raise the steam pressure. The practical steam pressure, however, has a limit.

Injection molding may produce good molding of teeth since it allows the use of a high injection pressure. In practice, however, it is difficult to apply injection molding techniques to the production of a belt which is a compound body of rubber, cords, etc. One reason is that the flow pressure of the material being injected into the mold will disturb the alignment of the cords that have been wound in advance around the mold, which will result in the production of belts that always meander or deviate to one side in use. Another problem may be a greater tendency to occur faults such as short shot and weld line.

Injection molding is a highly efficient method of production, and is generally used in the production of rubber vibration isolators and the like. With regard to the production of belts, however, there is only one instance, described in the Japanese Provisional Publication No., SHO.47-11692. The method of production described in the publication is for producing a V-shaped rubber belt, wherein an assembly of a stretching element (rubber) and tensile elements (cords) is molded beforehand and mounted in a ring-shaped recess in a mold, and then molten rubber is injected into the residual space in the recess by injection molding to form a V-shaped belt.

According to the method of production described in the above publication, the cords are integrated with a portion of the rubber before being placed in the recess of the mold. Hence the alignment of the cords will not be disturbed by injection molding. The process, however, is complicated and low in productivity, and does not exhibit the merits of injection molding.

SUMMARY OF THE PRESENT INVENTION

Apparatus in accordance with the present invention includes a mold that enables efficient and inexpensive production, utilizing injection molding, of toothed power transmission belts having clearly defined teeth and being free of any disturbance in the cord alignment and any other faults such as short shot and weld line.

Apparatus for injection molding according to the present invention comprises a cylindrical outer mold combined with a columnar inner mold. The inner mold is provided, on its external circumferential surface, with a large number of tooth-shaped grooves extending in the axial direction thereof, and is placed inside the outer mold to define a cavity between the external circumferential surface of the inner mold and the internal circumferential surface of the outer mold. The outer mold is provided with a plurality of runners extending axially near the internal circumferential surface. The runners are arranged at regular intervals along the circumference of the outer mold. Furthermore, slit-shaped gates are formed along the full length of the runners, the gates opening into the internal circumferential surface of the outer mold, in such a way that the inflow of molten molding material flowing from each runner into the cavity is gradually reduced along the runner from the upstream side towards the downstream side.

In a specific example, the specific dimensions of the runners and gates are set, for example, in such a way that when the cords (the tensile element) of a belt are wound around the external circumferential surface of the inner mold with a tension from 500 gf (4.9 N) to 1000 gf (9.8 N), the angle between the material flow direction in the cavity and the direction of the wound cords does not exceed $$(0.016 \times cord\ tension[gf] - 1) degrees.$$

When the molding material is neoprene rubber, the dimensions may be set in such a way that the sectional area A of the gate in a plane orthogonal to the axis of the outer mold and the sectional area B of said runner in the same plane have the relationship $$7 \geq (A/B) \times 100 \geq 4.$$

When toothed power transmission belts (including semifinished belt materials that have not been cut into rings with a desired width) are produced by injection molding using the mold according to the present invention, cords (or cords and canvas) are wound around the inner mold, and the inner mold is placed in the outer mold. Next, the mold is closed, and molten molding material is injected into the heated mold by an injection molding machine to mold and cross-link (vulcanize) a belt molding.

The injected molding material flows, via a plurality of runners and a plurality of gates of the outer mold, into the cavity between the inner and outer molds. As the inflow of the material flowing into the cavity gradually decreases along each runner from the upstream side towards the downstream side, the state of inflow of the material between two adjacent gates during injection will be as illustrated in FIG. 4. The flowing direction of the material forms a specified angle $\theta$ with the winding direction of the cords around the inner mold. The leading ends of the material flows gradually join in the middle of the gates from the upstream side towards the downstream side, whereby the material gradually fills up the cavity. The molded part is formed as follows:

(1) Well-defined satisfactory teeth are formed due to a high molding pressure of the injection molding machine.
(2) The alignment of the cords is not disturbed by the flow pressure of the material since the angle between the molding material flow and the cords wound around the inner mold with a certain tension is small (close to parallel with each other).
(3) Air or the like present in the cavity is gradually forced towards the downstream side and eventually expelled out of the cavity. Thus no weld lines are formed.
(4) No short shot is made since the molding material smoothly flows into the cavity and the cavity is filled with a sufficient amount of the material.
(5) Moldings are made efficiently at low cost since there is no need to produce rubber sheets beforehand, plus molding an assembly of rubber and cords, and then placing the assembly in a mold.

To be more specific, when the cords are wound around the inner mold with a tension from 500 gf (4.9 N) to 1000 gf (9.8 N), or when the molding material is neoprene rubber, the aforementioned effects are assured by setting the dimensions of the gates and runners as set out hereinafter.

BRIEF DESCRIPTION OF THE DRAWINGS

FIG. 3 is a sectional view along the line III—III of FIG. 1;

FIG. 4 is a front view illustrating the flow of molding material into the mold cavity;

FIG. 5 is an enlarged sectional view showing the dimensions of a runner and a gate;

FIG. 6 is a chart illustrating the relationship between the cord tension and the slanting angle of the molding material flow which does not disturb the cord alignment;

FIG. 8 is a perspective view of a toothed power transmission belt produced by the present invention.

DETAILED DESCRIPTION OF THE DRAWING

A preferred embodiment of a mold according to the present invention is described as follows with reference to the attached drawings. The mold illustrated produces, by injection molding, a molded toothed power transmission rubber belt which is subsequently cut into shorter width rings with a desired width as the final product.

Figure 1:
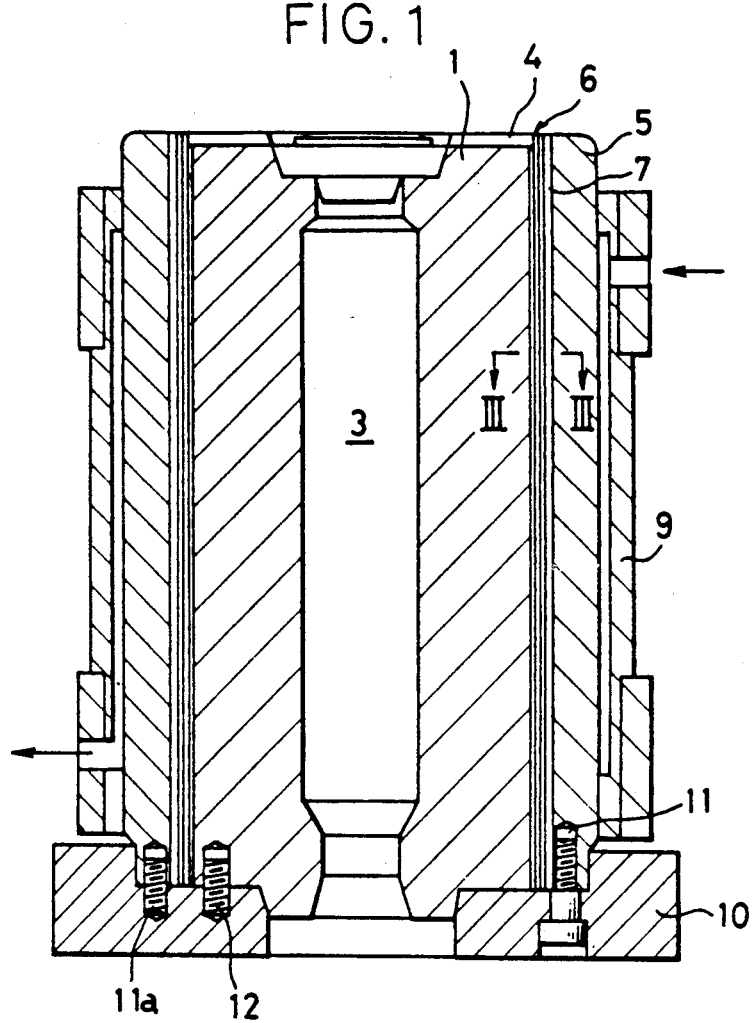
FIG. 1 is a longitudinal sectional view of a mold according to the present invention.
Figure 2:
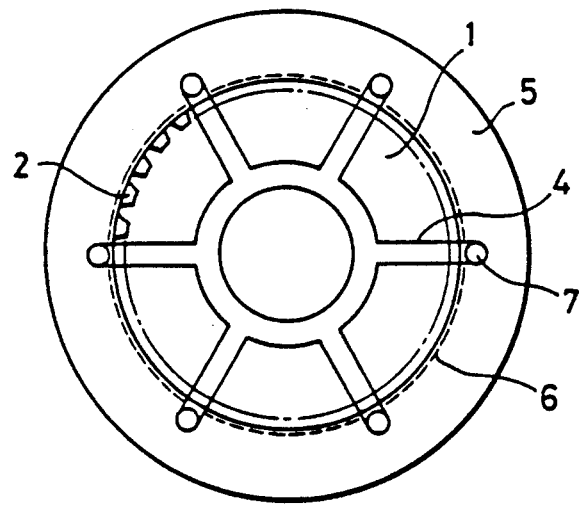
FIG. 2 is a plan view of the mold.

The columnar inner mold 1 shown in FIG. 1 is provided with a large number of axial tooth-shaped grooves 2 (see FIG. 2), corresponding to the teeth b of the toothed belt a (see FIG. 8), on the external circumferential surface of the inner mold as shown in FIG. 3. In the axial center of the inner mold 1, a flow jacket 3 is provided for passing heating steam or cooling water. On the top of the inner mold 1, a plurality (six in the present embodiment) of the first runners 4 are radially formed at regular angular intervals as shown in FIG. 2. The smaller the number of the runners 4, the smaller would be the loss of the molding material (rubber). To avoid molding faults due to short shot, however, it is better to use many runners 4. Furthermore, the shorter the circumferential extent of the belt, the smaller the number of the runners 4 needed. It, therefore, is desirable to determine the number of runners 4 according to the belt size.

The outer mold 5 is a hollow cylinder, and the inner mold is concentrically inserted into the hollow of the outer mold 5. When the inner mold 1 is inserted, as shown in FIG. 1 and FIG. 3, an annular cavity 6 is defined between the outer mold 5 and the inner mold 1. A plurality (six in the present embodiment) of second runners 7 (FIGS. 1 to 3) are axially cut in the outer mold 5 near the internal circumferential surface thereof. Each runner 7 is provided along its full length with a gap or slit-shaped gate 8 (FIGS. 3 and 5) opening into the interior circumferential surface of the outer mold 5 (cavity 6) as shown in FIG. 3. The opening of each gate 8 is slightly widened at its end which is adjacent the cavity 6. The outer mold 5 is provided, along its outer circumference, with a jacket 9 for the flow of heating steam as illustrated in FIG. 1. The outer mold 5 is mounted in the shown position on a base 10 by means of bolts 11 and locating members 11a, and when the inner mold 1 is inserted within the outer mold 5, the inner mold 1 is secured in the shown position by means of locating members 12. When the inner mold 1 is secured in the shown position within the outer mold 5, the first mentioned runners 4 of the inner mold 1 and the second mentioned runners 7 of the outer mold 5 are continuous or aligned with each other.

The second runners 7 and gates 8 of the outer mold 5 are specially contrived as follows:

Suppose that the sectional area of each gate 8 in a plane orthogonal to the axis of the outer mold 5 is significantly reduced relative to that of the second runner 7 so that the flow of the molding material from the runner 7, through the gate 8, to the cavity 6 is extremely restricted. In this case, the material would flow into the cavity 6 evenly over the full length of the runners 7 and gates 8 in a direction parallel to the tensile cords D (see FIG. 4) wound in advance around the inner mold 1. Hence the alignment of the cords would not be disturbed by the flow pressure. In this case, however, air present in the cavity 6 might remain in the junction of two material flows entering from the two adjacent gates 8, causing weld line or deficient welding between material flows.

With regard to this point, the inventors have determined that even when the flow direction of the molding material entering from each gate 8 into the cavity 6 were at a little slant to the winding direction of the cords D around the inner mold 1 as shown in FIG. 4, the cord alignment would not be disturbed nor would weld lines be generated provided the slant angle $\theta$ does not exceed a certain value. This is attributed to the fact that the cords D are wound around the inner mold 1 with a certain tension. After repeated experiments, the relationship between the tension in the wound cords D and the angle $\theta$ for not disturbing the alignment of the cords D has been successfully determined as shown in FIG. 6 (the line X indicates the boundary). For example, if the tension in the cords D is 500 gf (4.9 N), no cord alignment disturbance nor weld line would be generated when the slant angle $\theta$ of the molding material flow relative to the winding direction of the cords D is 7 degrees or less. If the tension in the cords D is 1000 gf (9.8 N), no disturbance nor weld line would occur when the angle $\theta$ is 15 degrees or under.

When the tension in the cords D is in the typical range from 500 gf to 1000 gf, the region below the segment X would be expressed by $$\theta \leq (0.016 \times \text{tension in cords D[gf]} - 1)^\circ.$$

It, therefore, is necessary to form the runners 7 and gates 8 so that the material will flow into the cavity 6 according to this condition. To this end, the dimensions of the gates 8 are set in such a way that the inflow of the material flowing through each gate 8 and into the cavity 6 is gradually reduced along the second runner 7 from the upstream side towards the downstream side. The dimensions of the runner 7 and of the opening of the gate 8 in any plane orthogonal to the axis of the outer mold 5 may be constant all along the full length of the runner 7. The reason is that the inflow of the molding material flowing into the cavity 6 is gradually reduced towards the downstream side due to the pressure loss which occurs when the molding material flows through the runner 7.

FIG. 4 shows the state of the molding material flowing from two adjacent gates into the cavity 6 in the mold arranged as described above. As the inflow of the material flowing into the cavity is gradually reduced along the runner 7 from the upstream end towards the downstream end and the slant angle $\theta$ is greater than zero, the material flowing into the cavity through an upper portion (upstream end) forces the air and the like towards the lower portion (downstream end) and the air discharges through air vents (not illustrated) in the base 10. Thus no weld lines will be generated. Furthermore, since the slant angle $\theta$ has a small value that meets the aforementioned condition, the alignment of the cords around the inner mold 1 are not disturbed.

Further, the greater the tension in the cords D wound around the inner mold 1, the larger will be the allowable slant angle $\theta$ of the molding material flow relative to the cords D. Hence the allowable range of formation of the second runners 7 and the gates will be extended. However, if the tension in the cords D is too large, it will become difficult to remove the belt molding from the inner mold 1. Moreover, the length of the finished belt will show a large change with the passage of time. Thus a very large tension D is not desirable. Accordingly, as mentioned above, it is desirable to set the tension in cords D at 500–1000 gf.

Next, specific examples of the dimensions of the second runners 7 and gates 8 when the molding material is neoprene rubber will be described as follows.

FIG. 5 shows in section the runner 7 and gate 8 in a plane orthogonal to the axis of the outer mold 5 (or the inner mold 1). There is no need to say that the sectional area A ($= L \times t$) of the gate 8 and the sectional B($= \pi D^2/4$) of the runner 7 are determined by the dimensions of the runner 7 and gate 8. The relations between the two sectional areas must meet a condition that will be explained below.

It has been confirmed by experiments using a prototype mold that when the value of ($A/B \times 100$) is set at 7 or less, the slant angle $\theta$ of the material flowing into the cavity relative to the cords D is within the region beneath the segment X of FIG. 6. When the value is less than 4, the loss of the molding material will increase and the operation will not be economical. Moreover, machining of the gates 8 will become difficult. It, therefore, is desirable to set the relationship between the sectional areas A and B by $$7 \geq (A/B) \times 100 \geq 4.$$

The viscosity of the neoprene rubber (chloroprene) used was 500–600 poises (measured by a capillary viscometer).

Figure 7:
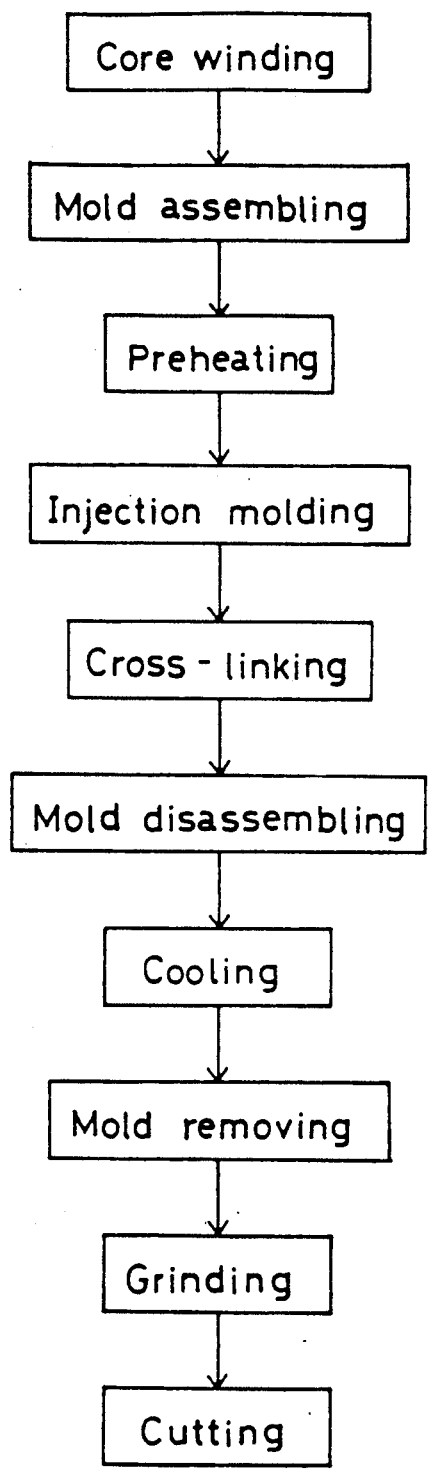
FIG. 7 is a flow diagram showing steps in the production of power transmission belts.

With reference to FIG. 7, the method for the injection-molding of a toothed power transmission belt with a mold according to the present invention is described as follows:

(1) A piece of canvas c and cords d are wound in sequence around the circumference of the inner mold 1 (see FIG. 8). First the canvas is installed and then the cords are wound tightly against the canvas and the teeth, from one end of the mold cavity to the other. (Core winding step.)

(2) The inner mold 1 is inserted into the outer mold 5 to assemble the mold. (Mold assembling step.)

(3) Steam is passed through the jackets 3 and 9 to heat the inner mold 1 and the outer mold 5 to the specified temperature. (Preheating step.)

(4) Molten unvulcanized rubber is injected by a prior art injection molding machine through a nozzle, via the first runners of the inner mold 1 and the second runners 7 of the outer mold 5 and the gates 8, into the cavity 6 to mold the belt. (Injection molding step.) Next, the material is vulcanized or cross-linked by heating. (Cross-linking step.) As the time required for cross-linking is several times as long as the injection time, the mold is moved away from the injection molding machine when the cross-linking has proceeded by about ten percent after the completion of injection, so that the cross-linking will be made in a separate place.

(5) when the cross-linking reaction is completed, the inner mold 1 is removed from the outer mold 5. (Mold disassembling step.)

(6) The belt molding is attached to the circumference of the inner mold 1, and cannot be removed when the molding temperature is high. Hence the molds are cooled first. (Cooling step.) Then the molding is removed from the inner mold 1. (Mold removing step.)

(7) The removed belt molding is ground on the back thereof to improve the thickness accuracy. (Grinding step.) Then the molding is cut into belts having the desired width. (Cutting step.) The toothed power transmission belts a illustrated in FIG. 8 are thus obtained as the final product.

The belt a has the teeth b, the canvas c for tooth flank protection, and the cords d being the tensile elements.

Quantitative and specific data for injection molding of a specific example of the aforementioned neoprene rubber belts such as the dimensions of the mold and injection molding conditions are as follows:

The inner mold 1 is provided with six first runners 4, and each runner 4 is rectangular in section, 4 mm wide and 4 mm deep. The Second runner 7 of the outer mold 5 is circular in section with the diameter D of 5 mm.

The gate 8 has a width t of 0.5 mm and a length L of 2 mm. In this case, for the aforementioned sectional areas A and B, we get $$A/B \times 100 = 5.1(\%).$$

The toothed power transmission rubber belt thus produced has 300 teeth with a pitch of 2.032 mm.
Other production conditions are as follows:

| Molding material: | neoprene rubber (viscosity: 500–600 poise); |
|---|---|
| Mold temperature: | 150° C. (preheated temperature); |
| Injection speed: | 30 cc/sec; |
| Injection capacity: | 310 cc; |
| Cross-linking time: | 2 min.; |
| Tension in cords: | 500 gf (4.9 N) |

With the aforementioned conditions, toothed power transmission rubber belts were successfully obtained, said belts showing no disturbance in the alignment of the cords D and having satisfactorily molded teeth B.

In the foregoing description only a specific example using rubber as the molding material was introduced. However, the mold for injection molding according to the present invention is also applicable to production of belts from other polymers such as plastics.

The mold for injection molding according to the present invention has the following beneficial effects:
(1) It requires no complicated processes such as those of the method for producing belts by injection molding as disclosed in the aforementioned publication. Fully exhibiting the features inherent to injection molding, the mold allows efficient and inexpensive production of toothed power transmission belts.
(2) The mold provides high-quality toothed power transmission belts free of disturbance of the cord alignment or any defaults such as weld line and short shot.
(3) When the cross sectional area of opening of the gate is set as described herein, the effects of the above-mentioned points (1) and (2) are assured.
(4) When the molding material is neoprene rubber, the setting of the opening sectional area of the gate as described herein achieves smaller loss of the molding material and easier and more practical machining of the mold as well as the effects mentioned above.

What is claimed is:

1. Apparatus for injection molding of toothed power transmission belts, comprising:
   an outer mold having a cylindrical interior space, a columnar inner mold having a plurality of axial tooth-shaped grooves on the external circumferential surface thereof, said inner mold being mounted in said interior space and defining, when inserted in said space, an annular cavity between said external circumferential surface of the inner mold and the internal circumferential surface of the outer mold,
   a plurality of axially extending runners being formed in the outer mold adjacent the internal circumferential surface thereof at substantially equal angular intervals about the internal circumferential surface,
   means for injecting a molten molding material into said runners, and
   each of said runners being provided with a slit-shaped gate opening to the internal circumferential surface of the outer mold over the full length of the runner such that the inflow of the molten molding material from each runner into said cavity is gradually decreased downstream from said injecting means.

2. Apparatus for injection molding of toothed power transmission belts as described in claim 1, wherein the relation between the cross sectional area A of said gate in a plane orthogonal to the axis of said outer mold and the cross sectional area B of said runner in the same plane is set by $$7 \geq (A/B) \times 100 \geq 4.$$

* * * * *